(12) United States Patent
Benayon et al.

(10) Patent No.: US 8,412,548 B2
(45) Date of Patent: Apr. 2, 2013

(54) LINKED DECISION NODES IN A BUSINESS PROCESS MODEL

(75) Inventors: Jay W. Benayon, Thornhill (CA); Pablo D. Irassar, Markham (CA); Vincent F. Szaloky, Toronto (CA)

(73) Assignee: International Business Machines Corporation, Armonk, NY (US)

(*) Notice: Subject to any disclaimer, the term of this patent is extended or adjusted under 35 U.S.C. 154(b) by 1492 days.

(21) Appl. No.: 11/945,681

(22) Filed: Nov. 27, 2007

(65) Prior Publication Data

US 2009/0138248 A1    May 28, 2009

(51) Int. Cl.
*G06Q 10/00* (2012.01)

(52) U.S. Cl. .............. 705/7.11; 705/7.12; 703/2; 703/6; 703/22

(58) Field of Classification Search ........ 705/7.11–7.15; 703/2, 6, 22
See application file for complete search history.

(56) References Cited

U.S. PATENT DOCUMENTS

| | | | |
|---|---|---|---|
| 5,392,220 A * | 2/1995 | van den Hamer et al. .... | 716/105 |
| 6,225,922 B1 * | 5/2001 | Norton ............................ | 341/87 |
| 6,278,977 B1 * | 8/2001 | Agrawal et al. .............. | 705/7.27 |
| 6,321,181 B1 * | 11/2001 | Havens .......................... | 703/13 |
| 6,456,993 B1 | 9/2002 | Freund | |
| 6,697,773 B1 * | 2/2004 | Karchmer et al. ............. | 703/15 |
| 6,704,719 B1 * | 3/2004 | Ericson ........................... | 706/48 |
| 6,865,517 B2 | 3/2005 | Bantz et al. | |
| 6,876,643 B1 | 4/2005 | Aggarwal et al. | |
| 7,222,149 B2 * | 5/2007 | Hamadi et al. ................ | 709/201 |
| 7,272,815 B1 * | 9/2007 | Eldridge et al. .............. | 717/101 |
| 7,428,486 B1 * | 9/2008 | Casati et al. .................... | 703/22 |
| 7,437,277 B2 * | 10/2008 | Benayon et al. ................. | 703/2 |
| 7,797,708 B2 * | 9/2010 | Weber et al. ................... | 719/313 |
| 2002/0023252 A1 * | 2/2002 | Lee et al. .......................... | 716/6 |
| 2002/0070956 A1 * | 6/2002 | Chan et al. ..................... | 345/714 |
| 2003/0167265 A1 * | 9/2003 | Corynen .......................... | 707/4 |
| 2004/0230404 A1 * | 11/2004 | Messmer et al. .................. | 703/1 |
| 2005/0010598 A1 * | 1/2005 | Shankar ..................... | 707/104.1 |
| 2005/0187977 A1 | 8/2005 | Frost | |
| 2005/0195221 A1 * | 9/2005 | Berger et al. ................. | 345/660 |

(Continued)

OTHER PUBLICATIONS

"A Classification of UML2 Activity Diagrams" Jana Koehler; Jochen M. Kuester; John Novatnack; Ksenia Ryndina; IBM Zurich Research Laboratory CH-8803 Rueschlikon Aug. 2006.*

(Continued)

*Primary Examiner* — Romain Jeanty
*Assistant Examiner* — Alan S Miller
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to decision node processing in a business process model and provide a method, system and computer program product for linked decision nodes in business process models. In an embodiment of the invention, a business process model simulation method can be provided. The method can include loading a business process model for simulation, designating a decision node in the business process model as a master decision node and linking another decision node in the business process model as a slave decision node to the master decision node. The method further can include simulating the master decision node to select an output pin and storing the selected output pin in association with the master decision node, and applying the selected output pin in the slave decision node when arriving at the slave decision node during the simulation without simulating the slave decision node.

8 Claims, 1 Drawing Sheet

U.S. PATENT DOCUMENTS

| | | | |
|---|---|---|---|
| 2005/0203953 A1 | 9/2005 | McGee et al. | |
| 2005/0210455 A1* | 9/2005 | Koehler et al. | 717/136 |
| 2005/0268247 A1* | 12/2005 | Baneth | 715/781 |
| 2006/0053106 A1* | 3/2006 | Bhaghavan et al. | 707/4 |
| 2006/0053216 A1 | 3/2006 | Deokar et al. | |
| 2006/0106657 A1* | 5/2006 | Pollak et al. | 705/7 |
| 2006/0129270 A1* | 6/2006 | Pankl et al. | 700/182 |
| 2006/0129956 A1* | 6/2006 | Ward | 716/4 |
| 2006/0143029 A1* | 6/2006 | Akbay et al. | 705/1 |
| 2007/0038416 A1* | 2/2007 | Benayon et al. | 703/2 |
| 2007/0283318 A1* | 12/2007 | Tong et al. | 717/104 |
| 2008/0065243 A1* | 3/2008 | Fallman et al. | 700/83 |
| 2008/0126409 A1* | 5/2008 | Weber et al. | 707/104.1 |
| 2009/0037237 A1* | 2/2009 | Weber et al. | 705/7 |
| 2009/0112908 A1* | 4/2009 | Wintel et al. | 707/102 |
| 2009/0113394 A1* | 4/2009 | Weber et al. | 717/126 |

OTHER PUBLICATIONS

"Semantics of UML 2.0 Activity Diagram for Business Modeling by Means of Virtual Machine" Valdis Vitolins; Audris Kalnins; Proceedings of the 2005 Ninth IEEE International EDOC Enterprise Computing Conference (EDOC'05) 0-7695-2441-9/05.*

"Automating the Design of SOCs Using Cores" Reinaldo A. Bergamaschi, Subhrajit Bhattacharya,Ronaldo Wagner, Colleen Fellenz, Michael Muhlada, William R. Lee, Foster White Jean-Marc Daveau, Application-Specific SOC Multiprocessors IEEE Design & Test of Computers 2001 IEEE.*

"Designing Systems-on-Chip Using Cores" Reinaldo A. Bergamaschi, William R. Lee ACM, Inc. DAC 2000, Los Angeles, California (c) 2000ACM 1-58113-188-7/00/0006.*

"BALBOA: A Component-Based Design Environment for System Models" Frederic Doucet, , Sandeep Shukla, , Masato Otsuka, and Rajesh Gupta, IEEE Transactions on Computer-Aided Design of Integrated Circuits and Systems, Vol. 22, No. 12, Dec. 2003.*

"Reduce complexity with model-driven development, Part 4: Modeling business processes with WebSphere Business Integration Modeler V5.1" Lori Small, Milena Litoiu, Sep. 24, 2004.*

"Business Process Transformation Patterns & The Business Process Transformation Wizard" Bala Ramachandran, Kaori Fujiwara, Makoto Kano, Akio Koide, Jay Benayon, Proceedings of the 2006 Winter Simulation Conference L. F. Perrone, F. P. Wieland, J. Liu, B. G. Lawson, D. M. Nicol, and R. M. Fujimoto, eds.*

"An Evaluation of Conceptual Business Process Modelling Languages" Beate List, Brigit Korherr SAC'06, Apr. 23-27, 2006, Dijon, France. Copyright 2006 ACM 1-59593-108-2/06/0004.*

"Simulation of contact in finite deformation problems—algorithm and modelling issues" R.G. Sauve, G.D. Morandin, International Journal of Mechanics and Materials in Design (2004) 1:287-316 _ Springer 2005 DOI 10.1007/s10999-004-1492-1.*

"UML4SPM: A UML2.0-Based Metamodel for Software Process Modelling" Reda Bendraou1, Marie-Pierre Gervais, Xavier Blanc', L. Briand and C. Williams (Eds.): MoDELS 2005, LNCS 3713, pp. 17-38, 2005. Springer-Verlag Berlin Heidelberg 2005.*

Abdi, Samar, et al; Automatic Communication Refinement for System Level Design; DAC 2003, Jun. 2-6, 2003, Anaheim, CA; ACM.

* cited by examiner

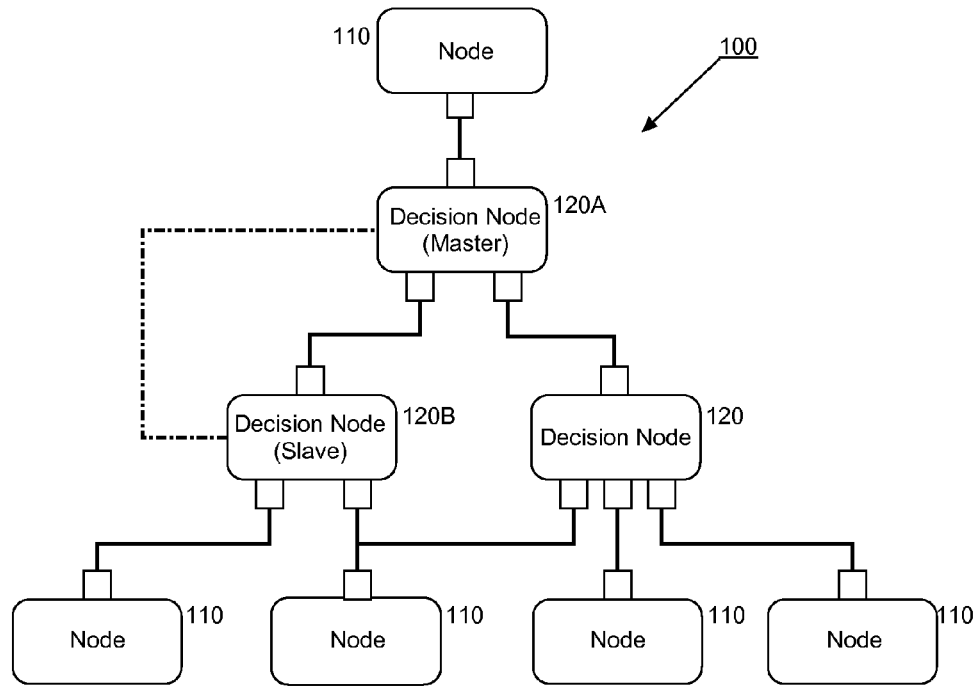
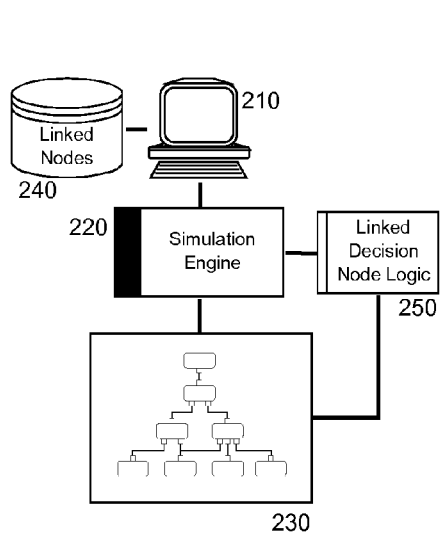
FIG. 2
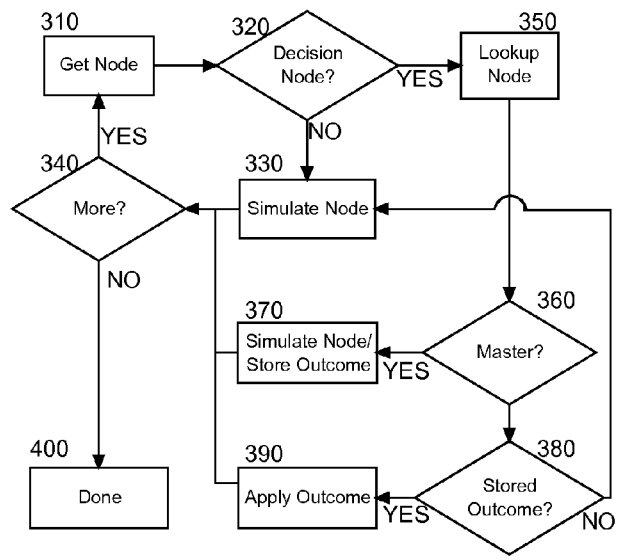
FIG. 3

LINKED DECISION NODES IN A BUSINESS PROCESS MODEL

BACKGROUND OF THE INVENTION

1. Field of the Invention

The present invention relates to the field of business process modeling and more particularly to simulating decision nodes in a business process model.

2. Description of the Related Art

Process modeling and simulation relates to the modeling and simulation of dynamic or static systems, which can include, but are not limited to, enterprise management systems, engineering systems, networked information technology systems, utility systems, utility computing systems, autonomic computing systems, on-demand systems, electric power grids, biological systems, medical systems, weather systems, financial market systems, and business process systems. Such systems can be modeled and simulated for a variety of purposes including monitoring, analysis, control, design, simulation, and management.

A process model is an abstract description of a process such as a business process or any other process related to the lifecycle of a system. The abstract description of the process model can include sufficient detail required by a simulation engine for exercising the process model with one or more scenarios to determine a likely outcome. Process models generally specify one or more tasks or activities of a process and the relationship between the different tasks or activities. As part of the model, one or more events or conditions leading to the transition from one task or activity to the next can be specified. Models generally are expressed according to a specific format. Exemplary formats include Activity Decision Flow (ADF) Unified Modeling Language (UML) activity diagrams, and the Business Process Execution Language (BPEL), to name only a few.

Most process modeling notations provide for a set of nodes connected by flow-of-control and in some cases flow-of-data. These nodes correspond to a set of behavioral elements that have been in use from flowcharts onward into modern business process modeling. A core set of node types include tasks, decisions, merges, forks and joins. Tasks are nodes where actions are performed and decisions are nodes where decisions are performed, and the flow of control of a process branches along mutually exclusive paths. Merges are nodes where branches in a process are brought together. Finally, forks are nodes where the flow of control of a process forks into multiple, parallel, paths, while joins are nodes where the parallel flows of control from a previous fork are brought together.

The decision making performed in a decision node can involve processing overhead when simulating a decision node. This result cannot be escaped for a unique decision node; however, a redundancy occurs where the outcome from processing one decision node differs little from the outcome when processing a related decision node. Specifically, where the outcome of one decision node should not vary from the outcome of another decision node, processing overhead can be needlessly incurred without changing the outcome for processing the latter decision node.

BRIEF SUMMARY OF THE INVENTION

Embodiments of the present invention address deficiencies of the art in respect to decision node processing in a business process model and provide a novel and non-obvious method, system and computer program product for linked decision nodes in business process models. In an embodiment of the invention, a business process model simulation method can be provided. The method can include loading a business process model for simulation, designating a decision node in the business process model as a master decision node and linking another decision node in the business process model as a slave decision node to the master decision node. The method further can include simulating the master decision node to select an output pin and storing the selected output pin in association with the master decision node, and applying the selected output pin in the slave decision node when arriving at the slave decision node during the simulation without simulating the slave decision node.

In aspect of the embodiment, the method also can include simulating the slave decision node to select an output pin when the master decision node has not stored a selected output pin. In another aspect of the embodiment, the method can include validating the master decision node and the slave decision node to ensure compatibility. In this regard, validating the master decision node and the slave decision node to ensure compatibility can include comparing the master decision node to the slave decision node to ensure that input and output pins for the master decision node and the slave decision node match, that both a configuration and names for the input and the output pins for the master decision node and the slave decision node match and that tests for the master decision node and the slave decision node match. Further, validating the master decision node can include ensuring that the master decision node and the slave decision node do not override a current flow mode of simulation and that the input and output pins of the master decision node and the slave decision node do not span process boundaries in the business process model.

In another embodiment of the invention, a business process model simulation data processing system can be provided. The system can include a simulation engine executing in a host computing platform and a business process model coupled to the simulation engine for simulation by the simulation engine. The model can include nodes including decision nodes where a selection of the decision nodes are designated master decision nodes and a corresponding selection of the decision nodes are designated slave decision nodes, each being associated with one of the master decision nodes. The system yet further can include a data store of linked nodes storing output pin selections, each corresponding to a different one of the master decision nodes. Finally, the system can include linked decision node logic. The logic can include program code enabled to apply an output pin selection to a slave decision node corresponding to an output pin selection in the data store corresponding to a master decision node linked to the slave decision node.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for managing linked decision nodes in a business process model;

FIG. 2 is a schematic illustration of a simulation data processing system configured for managing linked decision nodes in a business process model; and, FIG. 3 is a flow chart illustrating a process for managing linked decision nodes in a business process model.

DETAILED DESCRIPTION OF THE INVENTION

Embodiments of the present invention provide a method, system and computer program product for linked decision nodes in a business process model. In accordance with an embodiment of the present invention, a set of decision nodes can be selected in a business process model and one of the nodes can be designated a master node while the remaining nodes can be designated slave nodes. The master and slave nodes can be verified to be compatible and if so, the decision outcome made after processing the master node during simulation can be stored and applied subsequently as the outcome of the slave nodes without processing the slave nodes. In this way, the processing overhead associated with processing similar decision nodes can be avoided.

In further illustration, FIG. 1 is a pictorial illustration of a process for managing linked decision nodes in a business process model. As shown in FIG. 1, a process model 100 can include multiple different nodes 110 including decision nodes 120, 120A, 120B. Decision nodes 120, 120A, 120B provide a test which when evaluated acts to select one of two or possible paths in a flow to a next nodes. Non-decision ones of the nodes 110, by comparison, include action nodes in which an action is performed when a token arrives in the non-decision one of the nodes 110. In this way, a flow through a business process can be simulated by traversing a corresponding business process model 110 node by node.

Notably, both a master decision node 120A and a corresponding slave decision node 120B can be defined in the business process model 100. The master decision node 120A can act as any other decision node 120 excepting that the outcome of evaluating the test for the master decision node 120A can be stored and applied when reaching the corresponding slave decision node 120B during simulation of the business process model 100. To that end, the master decision node 120A and the slave decision node 120B must be compatible in that the input and output pins for the master decision node 120A and the slave decision node 120B must match, the configuration and names of the input and the output pins for the master decision node 120A and the slave decision node 120B must match, and the tests for the master decision node 120A and the slave decision node 120B must match.

Preferably, the master decision node 120A and the slave decision node 120B should not override a current flow mode of simulation such as a random mode, a probability mode and an expression mode meaning that the test applied is simulated according to a random selection of output pins, a probabilistic determination of output pins, or an logical selection of output pins based upon the evaluation of an expression. Further, it is preferred albeit not required that the input and output pins of the master decision node 120A and the slave decision node 120B do not span process boundaries in the business process model 100.

The skilled artisan will recognized the simplistic illustration of the business process model 100; however, it is to be further recognized that unlimited layers of complexity can be added to the business process model 100 in keeping within the spirit of the embodiment of the invention shown herein. Namely, multiple different master decision nodes can be placed within the business process model 100, each having a multiplicity of different corresponding slave decision nodes. Further, each of the master decision nodes and slave decision nodes can include as few as a single input pin and two output pins, and as many as multiple input pins and multiple output pins.

The process shown in FIG. 1 can be implemented in conjunction with a business process model simulation data processing system. In illustration, FIG. 2 schematically depicts a simulation data processing system configured for managing linked decision nodes in a business process model. The system can include a host computing platform 210 supporting the execution of a business process simulation engine 220. The business process simulation engine 220 can be configured to simulate a business process model 230 representative of a business process of interest.

Notably, linked decision node logic 250 can be coupled to the simulation engine 220 and can be configured to access a data store of linked nodes 240. The data store of linked nodes 240 can store a listing of master decision node output pin selections and also a listing of corresponding slave decision nodes. Alternatively, the data stored within the data store of linked nodes 240 can be encapsulated within the business process model 230 itself such that each decision node encapsulates whether or not the decision node is linked to another node as a master or slave decision node, the identity of a corresponding master decision node if apropos, and a last stored selection of a master decision node if apropos.

The linked decision logic 250 can include program code first to validate a selection of pairings between master decision nodes and corresponding slave decision nodes in order to ensure compatibility. Thereafter, the program code can be enabled to be executed when a simulation of the business process model 230 requires a selection of an output pin through an evaluation of a decision node in the business process model 230. Once executed, the program code can be enabled to determine whether or not a decision node is a master decision node, or a slave decision node. If the decision node is a master decision node, the decision node can be processed either in random, probabilistic or expression mode, and the outcome—namely the selection of an output pin can be applied and the selection can be stored in association with the master decision node.

Conversely, if the decision node is a slave decision node, a corresponding master decision node can be identified. If the master decision node has stored a previous selection of an output pin, the previous selection can be applied to the slave decision node without requiring the simulation engine 220 to process the slave decision node independently. Of course, if the decision node is neither a master decision node or a slave decision node, or alternatively if the corresponding master decision node has not previously stored a selection of an output pin (indicating a chronological arrival at the slave decision node prior to the master decision node), then the decision node can be processed by the simulation engine 220.

In yet further illustration, FIG. 3 is a flow chart illustrating a process for managing linked decision nodes in a business process model. Beginning in block 310, a first node on the business process model can be selected for processing. In decision block 320, if the selected node is not a decision node, in block 330 the selected node can be simulated and in decision block 340, it can be determined whether additional nodes in the business process model remain to be simulated. If so, a next node in the business process model can be selected in block 310 an in decision block 320, it again can be determined whether the selected node is a decision node.

In decision block 320, if it is determined that the selected node is a decision node, in block 350 the node can be consulted either internally through encapsulated data, or externally in a separate data store to determine the nature of the decision node. Specifically, in decision block 360 it can be determined whether or the not the decision node is a master decision node. If so, in block 370 the master decision node can be simulated and the outcome can be stored for subsequent use. Otherwise, in decision block 380 it can be determined whether a stored outcome exists in connection with the decision node. If so, the node can be determined to be a slave decision node and in block 390 the outcome can be applied to the slave decision node.

In contrast, if a stored outcome does not exist for the decision node, it is either because the decision node is neither a slave decision node nor a master decision node, or because the slave decision node precedes the master decision node chronologically in terms of simulation flow through the business process model. In either case, the decision node can be simulated in block 330 and again it can be determined whether additional nodes remain to be simulated in the business process model. If not, the process can end in block 400.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer program product comprising a computer usable storage medium storing computer usable program code for business process model simulation, the computer program product comprising:
    computer usable program code for loading a business process model for simulation;
    computer usable program code for designating a decision node in the business process model as a master decision node and linking another decision node in the business process model as a slave decision node to the master decision node;
    computer usable program code for simulating the master decision node to select an output pin and storing the selected output pin in association with the master decision node; and,
    computer usable program code for applying the selected output pin in the slave decision node when arriving at the slave decision node during the simulation without simulating the slave decision node.

2. The computer program product of claim 1, further comprising computer usable program code for simulating the slave decision node to select an output pin when the master decision node has not stored a selected output pin.

3. The computer program product of claim 1, further comprising computer usable program code for validating the master decision node and the slave decision node to ensure compatibility.

4. The computer program product of claim 3, wherein the computer usable program code for validating the master decision node and the slave decision node to ensure compatibility, comprises computer usable program code for comparing the master decision node to the slave decision node to ensure that input and output pins for the master decision node and the slave decision node match.

5. The computer program product of claim 4, wherein the computer usable program code for validating the master decision node and the slave decision node to ensure compatibility, further comprises computer usable program code for comparing the master decision node to the slave decision node to ensure that both a configuration and names for the input and the output pins for the master decision node and the slave decision node match.

6. The computer program product of claim 5, wherein the computer usable program code for validating the master decision node and the slave decision node to ensure compatibility, further comprises computer usable program code for comparing the master decision node and the slave decision node to ensure that tests for the master decision node and the slave decision node match.

7. The computer program product of claim 6, wherein the computer usable program code for validating the master decision node and the slave decision node to ensure compatibility, further comprises computer usable program code for comparing the master decision node and the slave decision node to ensure that the master decision node and the slave decision node do not override a current flow mode of simulation.

8. The computer program product of claim 6, wherein the computer usable program code for validating the master decision node and the slave decision node to ensure compatibility, further comprises computer usable program code for comparing the master decision node and the slave decision node to ensure that the input and output pins of the master decision node and the slave decision node do not span process boundaries in the business process model.

* * * * *